(12) United States Patent
Vecera et al.

(10) Patent No.: US 10,037,286 B2
(45) Date of Patent: Jul. 31, 2018

(54) PRIVATE PARTITION WITH HARDWARE UNLOCKING

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 23 days.

(21) Appl. No.: 14/469,433

(22) Filed: Aug. 26, 2014

(65) Prior Publication Data

US 2016/0065371 A1    Mar. 3, 2016

(51) Int. Cl.
*H04L 29/06*    (2006.01)
*G06F 12/14*    (2006.01)
*H04L 9/08*    (2006.01)

(52) U.S. Cl.
CPC ........ *G06F 12/1408* (2013.01); *H04L 9/0897* (2013.01); *G06F 2212/1052* (2013.01)

(58) Field of Classification Search
CPC ........... G06F 1/163; G06F 3/00; H04L 1/0005
See application file for complete search history.

(56) References Cited

U.S. PATENT DOCUMENTS

| | | |
|---|---|---|
| 7,155,615 B1 | 12/2006 | Silvestor |
| 8,539,245 B2 | 9/2013 | Swanson et al. |
| 8,751,782 B2 | 6/2014 | Khosravi et al. |
| 2006/0050870 A1* | 3/2006 | Kimmel .............. H04L 63/0428 380/30 |
| 2007/0180509 A1* | 8/2007 | Swartz .................. G06F 9/4406 726/9 |
| 2011/0161551 A1 | 6/2011 | Khosravi et al. |
| 2013/0268767 A1* | 10/2013 | Schrecker .............. G06F 21/31 713/185 |

FOREIGN PATENT DOCUMENTS

| | | |
|---|---|---|
| CN | 103176918 A | 6/2013 |
| CN | 103198032 A | 7/2013 |
| WO | WO2009009921 A1 | 1/2009 |

OTHER PUBLICATIONS

Bob Rankin Five Super-Secure External Hard Drives, retrieved from http://askbobrankin.com/five_supersecure_external_hard-_drives.html on Aug. 26, 2014.

(Continued)

*Primary Examiner* — Joseph P Hirl
*Assistant Examiner* — Leynna Truvan
(74) *Attorney, Agent, or Firm* — Haynes and Boone, LLP

(57) ABSTRACT

Systems and methods for controlling access to a private partition on a storage device are disclosed for. An example system includes a token reader that detects a hardware token storing a private key and obtains the private key stored on the hardware token. The system also includes a partition controller that determines whether the private key unlocks a private partition on a storage device. In response to determining that the private key unlocks the private partition, the partition controller unlocks the private partition on the storage device. The private partition is invisible to an operating system executing in the computer system when the private partition is locked.

20 Claims, 4 Drawing Sheets

(56) References Cited

OTHER PUBLICATIONS

Apricorn, Aegis Vault Hardware Encrypted Portable Hard Drive, retrieved from http://www.apricorn.com/media/uploads/Aegis_Vault_Manual.pdf on Aug. 26, 2014, copyrighted 2007, 24 pages.

David, Partition your External Hard Drive to Create Private and Public Areas, 10 pages, retrieved from http://7labs.heypub.com/tips-tricks/partition-external-hd-private-public.html on Aug. 26, 2014.

* cited by examiner

PRIVATE PARTITION WITH HARDWARE UNLOCKING

BACKGROUND

The present disclosure generally relates to computing systems, and more particularly to controlling access to a private partition on a storage device.

Data security is an important topic. It may be difficult to hide data stored on a storage device because others may be able to view the data. Software solutions may pose risks due to hackers and other complications. For example, if a hacker knows that a particular storage device stores private data, the hacker may attempt to retrieve that private data. Additionally, a password that allows a user access to the private data may be comprised.

BRIEF SUMMARY

Methods, systems, and techniques for controlling access to a private partition on a storage device are provided.

According to an embodiment, a method of controlling access to a private partition on a storage device includes detecting a hardware token storing a private key and obtaining the private key stored on the hardware token. The method also includes determining whether the private key unlocks a private partition on a storage device. The private partition is invisible to an operating system executing in the computer system when the private partition is locked. The method further includes in response to determining that the private key unlocks the private partition, unlocking the private partition on the storage device.

According to another embodiment, a system for controlling access to a private partition on a storage device includes a token reader that detects a hardware token storing a private key and obtains the private key stored on the hardware token. The system also includes a partition controller that determines whether the private key unlocks a private partition on a storage device. In response to determining that the private key unlocks the private partition, the partition controller unlocks the private partition on the storage device. The private partition is invisible to an operating system executing in the computer system when the private partition is locked.

According to another embodiment, a non-transitory machine-readable medium includes a plurality of machine-readable instructions that when executed by one or more processors are adapted to cause the one or more processors to perform a method including: detecting a hardware token storing a private key; obtaining the private key stored on the hardware token; determining whether the private key unlocks a private partition on a storage device, where the private partition is invisible to an operating system executing in the computer system when the private partition is locked; and in response to determining that the private key unlocks the private partition, unlocking the private partition on the storage device.

BRIEF DESCRIPTION OF THE DRAWINGS

The accompanying drawings, which form a part of the specification, illustrate embodiments of the invention and together with the description, further serve to explain the principles of the embodiments.

Figure 1:
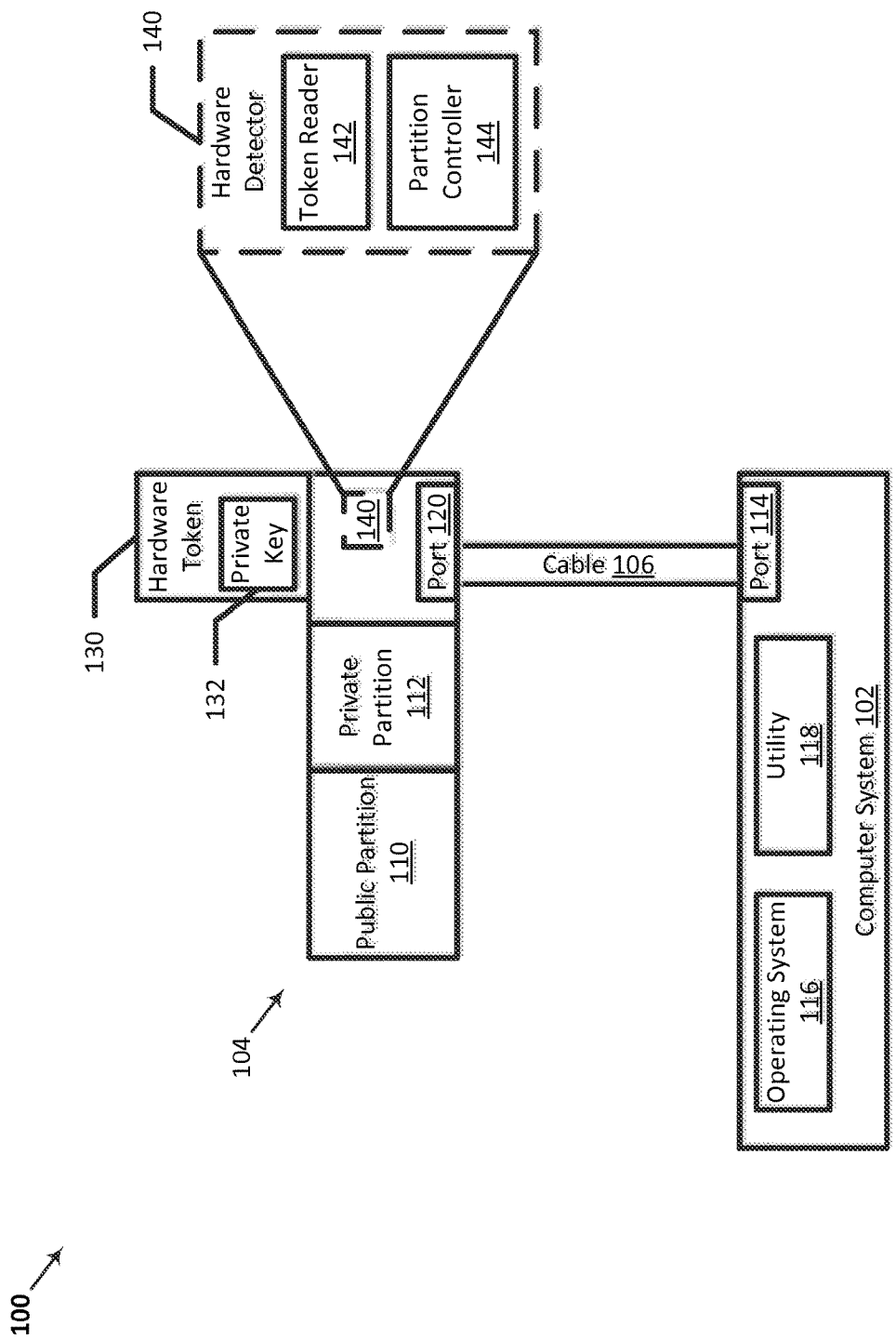
FIG. 1 is a block diagram illustrating a system for controlling access to a private partition on data storage, according to some embodiments.

Embodiments of the present disclosure and their advantages are best understood by referring to the detailed description that follows. It should be appreciated that like reference numbers may indicate identical or functionally similar elements. The drawing in which an element first appears is generally indicated by the left-most digit in the corresponding reference number.

DETAILED DESCRIPTION

I. Overview
II. Example System Architecture
  A. Computer System Connected to Data Storage
  B. Security Mechanism—Hardware Token and Hardware Detector
  C. Hardware Token is Not Detected
  D. Hardware Token is Detected
    1. Private Key Does Not Unlock Private Partition
    2. Private Key Unlocks Private Partition
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure introduces techniques to improve data security. For example, data may be stored in different partitions of data storage. A user may desire a first partition to be viewable to the public and a second partition to be private and thus not viewable to the public. Software solutions, such as request that the user enter a password via an input device (e.g., keypad or touchscreen) may be compromised. It may be desirable to protect the data stored on data storage via a hardware token that stores a private key.

In an example, a method of controlling access to a private partition on a storage device includes detecting a hardware token storing a private key and obtaining the private key stored on the hardware token. The method also includes determining whether the private key unlocks a private partition on a storage device. The private partition is invisible to an operating system executing in the computer system when the private partition is locked. The method further includes in response to determining that the private key unlocks the private partition, unlocking the private partition on the storage device

II. Example System Architecture

FIG. 1 is a block diagram 100 illustrating a system for controlling access to a private partition 112 on data storage 104, according to some embodiments. FIG. 1 includes a computer system 102, which may be, for example, a workstation, personal computer, server, game console, set-top box, kiosk, embedded system, mobile device (e.g., a mobile phone, personal digital assistant, tablet, and laptop), or other device having at least one processor and memory.

A. Computer System Connected to Data Storage

Computer system 102 is connected to data storage 104 via a cable 106. Computer system 102 includes a port 114 through which cable 106 may connect to computer system 102. In an example, cable 106 is a universal serial bus (USB) cable, and port 114 is a USB port. Computer system 102 also includes an operating system 116 and a utility 118 that provide information about data storage 104 to a user. Operating system 116 and utility 118 are discussed in more detail below.

Data storage 104 may be any data storage device that is capable of storing and retrieving data. In FIG. 1, data storage 104 is an external storage device and may be, for example, an external hard drive, flash drive, or memory card. In some embodiments, a power supply is connected to data storage 104. If data storage 104 uses external power, the power supply is connected to an electrical outlet. Data storage 104 includes a port 120 through which cable 106 may connect to data storage 104. Cable 106 may be connected to data storage 104 through port 120 and also connected to computer system 102 through port 114. When data storage 104 and computer system 102 are connected (e.g., via cable 106), data may be transmitted between the two systems.

Data storage 104 may range in size and storage capacity. To diminish doubts that data storage 104 is an ordinary data storage device, public partition 110 may be of a capacity size that is a common capacity size for a partition. In an example, public partition 110 is 250 gigabytes (GB) or larger.

Data storage 104 may be split into a plurality of partitions. When data storage 104 is partitioned, logical volumes are created for each partition on data storage 104, and each partition is accessible as though it were a separate disk. Data storage 104 includes a public partition 110 and a private partition 112. Utility 118 may create the plurality of partitions on data storage 104 based on, for example, a user's command. In another example, the user may buy data storage 104 already partitioned. When data storage 104 and computer system 102 are connected, operating system 116 may detect data storage 104 as a local hard drive. For example, utility 118 displays information about data storage 104 connected to computer system 102 along with information about the partitions. Utility 118 may indicate a connection to data storage 104 when public partition 110 is visible to operating system 116.

Public partition 110 may store data that is generally accessible to the public and visible to operating system 116. A partition is visible to operating system 116 if operating system 116 knows that the partition exists and is able to access it. For example, operating system 116 may perform write, read, or modify operations on a visible partition.

Private partition 112 may store data that is private and inaccessible to the public. A virtual barrier may exist between public partition 110 and private partition 112. For example, private partition 112 may be locked by default and thus, invisible to operating system 116. A partition is invisible to operating system 116 if operating system 116 does not know that the partition exists and is unable to access it. For example, operating system 116 may be unable to perform write, read, or modify operations on an invisible partition.

B. Security Mechanism—Hardware Token and Hardware Detector

FIG. 1 includes a hardware token 130 and a hardware detector 140 that provide a security mechanism to control access to private partition 112 on data storage 104. In an example, hardware token 130 is powered by data storage 104 and/or does not use batteries. In such an example, data storage 104 may include a transformer that transfers electric energy to hardware token 130. The transformer may include a primary coil located in data storage 104 and a secondary coil located in hardware token 130, where the primary coil is connected to a source of alternating current (AC) and causes an AC voltage across the secondary coil.

Hardware token 130 stores a private key 132 and may provide the user with access to private partition 112 on data storage 104. Private key 132 may include binary data that is randomly generated and unique to each hardware token 130. For security, it may be desirable to encrypt the data stored on private partition 112. In an example, computer system 102 stores a public key (not shown) that is used to encrypt the data to be stored on private partition 112, and sends the encrypted data to private partition 112 for storage (e.g., via cable 106). The encrypted data may then be stored on private partition 112. If the data is requested at a later point in time, the encrypted data stored on private partition 112 may be decrypted and provided to computer system 102.

Hardware token 130 is a tangible device that is maintained by a user and that may vary in size and shape. Users may keep hardware token 130 in their pocket, on their key ring, or other belongings. It may be desirable for hardware token 130 to be small so that users may easily carry it around. When a user desires to access private partition 112, the user may place hardware token 130 within a threshold proximity to hardware detector 140.

In the example illustrated in FIG. 1, hardware detector 140 is located inside data storage 104. When data storage 104 gets enough power, hardware detector 140 may determine whether a hardware token is within the threshold proximity. Hardware detector 140 includes a token reader 142 that detects a hardware token storing a private key. Token reader 142 detects hardware token 130 when hardware token 130 is within the threshold proximity to token reader 142. The threshold proximity may vary depending on the strength of the signals emitted from a hardware token to a hardware detector. As such, the threshold proximity for hardware token 130 to be detected by hardware detector 140 may be closer to or farther from the threshold proximity for another hardware token.

The user may physically place hardware token 130 on top of data storage 104 such that hardware token 130 is within the threshold proximity to hardware detector 140. The user may read a manual (e.g., provided by the manufacture of data storage 104 or a company that provides the technology provided in the disclosure to control access to private partition 112 on data storage 104) to determine the location of hardware detector 140 inside data storage 104. It may be desirable for data storage 104 to not have any visual markings indicating that it includes hardware detector 140. As such, data storage 104 may look like an ordinary data storage device, and it may not be obvious that data storage 104 has a private partition. In another example, data storage 104 includes a special port to which to connect hardware token 130 such that it connects with hardware detector 140 located inside data storage 104.

C. Hardware Token is not Detected

Without hardware token 130, public partition 110 is available to the user and private partition 112 may be unavailable to the user. Partition controller 144 controls access to the partitions on data storage 104. Partition controller 144 may, by default, keep private partition 112 locked until a private key that unlocks the private partition is obtained. Accordingly, the user may access public partition 110 and write to, read from, and/or modify data stored on public partition 110 while private partition 112 remains locked and thus invisible to operating system 116.

If token reader 142 does not detect a hardware token, private partition 112 remains locked and utility 118 provides a user access to public partition 110. Computer system 102 indicates a connection to data storage 104 and in particular to public partition 110. In such an example, the user is not provided access to private partition 112 and may not even be aware that data storage 104 has a private partition.

In an embodiment, operating system 116 is a LINUX® operating system, and utility 118 mounts public partition 110 onto operating system 116 for the user to access. Trademarks are the properties of their respective owners.

D. Hardware Token is Detected

If token reader 142 detects hardware token 130, token reader 142 obtains private key 132 stored on hardware token 130. In an example, token reader 142 requests private key 132 from hardware token 130, and hardware token 130 sends private key 132 to token reader 142. In another example, token reader 142 does not request private key 132 from hardware token 130. In this example, hardware token 130 may automatically send private key 132 to hardware detector 140. Token reader 142 may read private key 132 from hardware token 130, which may send private key 132 to hardware detector 140, using, for example, a wireless transfer technology (e.g., Wi-Fi) or other data transfer technology. For example, token reader 142 may be a bar code reader that scans hardware token 130 for private key 132.

Partition controller 144 determines whether private key 132 unlocks private partition 112 on data storage 104 such that a user may be provided access to private partition 112. In an example, private partition 112 may be empty and private key 132 is new. The user may initialize token reader 142 to bind to hardware token 130 such that when token reader 142 reads private key 132 stored in hardware token 130, partition controller 144 determines that private key 132 unlocks private partition 112. Partition controller 144 may encrypt the data using private key 132 and an encryption function, thus binding token reader 142 to private key 132 for the first write to data storage 104. Partition controller 144 may then store the encrypted data in private partition 112. The user may then have access to and write data into private partition 112 at a later point in time.

Partition controller 144 may determine whether private key 132 unlocks private partition 112 in a variety of ways. In an example, partition controller 144 determines a label based on the data to be stored in private partition 112. For example, partition controller 144 may assign the first N bytes of the unencrypted data to be stored on private partition 112 as the label, where N is a whole number greater than one. At a later point in time, token reader 142 may detect the same or different hardware token and read the private key stored in that hardware token. Partition controller 144 may use the first N bytes of the encrypted data and private key 132 as an input into a decryption function. An output of the decryption function is compared against the label to determine whether they match.

In response to determining that the output of the decryption function matches the label, partition controller 144 may determine that the private key unlocks private partition 112. Accordingly, the private key that was used to encrypt the data stored on private partition 112 is the same one that was most recently read by token reader 142. In contrast, in response to determining that the output of the decryption function does not match the label, partition controller 144 may determine that the private key does not unlock private partition 112. Accordingly, the private key that was used to encrypt the data stored on private partition 112 is different from the one that was most recently read by token reader 142. It will be understood that using the first N bytes to determine the label is by example, and that other data or bytes may be used (e.g., bytes 4-7 of the data).

1. Private Key does not Unlock Private Partition

In response to determining that private key 132 does not unlock private partition 112, private partition 112 remains locked and utility 118 provides a user access to public partition 110. Computer system 102 indicates a connection to data storage 104 and in particular to public partition 110. In such an example, the user is not provided access to private partition 112 and may not even be aware that data storage 104 has a private partition.

Partition controller 144 may, by default, keep private partition 112 locked until a private key that unlocks the private partition is obtained. Public partition 110 is visible to operating system 116 executing in computer system 102 when private partition 112 is locked. Accordingly, the user may access public partition 110 and write to, read from, and/or modify data stored on public partition 110 while private partition 112 remains locked and thus invisible to operating system 116. In an embodiment, operating system 116 is a LINUX® operating system, and utility 118 mounts public partition 110 onto operating system 116.

Although hardware token 130 is illustrated as storing one private key, this is not intended to be limiting and hardware token 130 may store one or more private keys. As such, a user may purchase more than one data storage device and use the same hardware token to access private partitions on multiple data storage devices. In such an example, hardware token 130 may include a private key for each of the private partitions, and each of the private keys may be used to encrypt data on the different private partitions. Partition controller 144 may determine whether a first private key stored in hardware token 130 unlocks private partition 112. If the first private key is determined to not unlock private partition 112, partition controller 144 may determine whether a second private key stored in hardware token 130 unlocks private partition 112. The user may use the first private key for data storage at home and the second private key for data storage at work. In response to determining that the second private key unlocks private partition 112, partition controller 144 unlocks private partition 112 on storage device 104. Partition controller 144 may continue to check each of the private keys stored in hardware token 130 until one matches or until none are determined to unlock private partition 112.

Additionally, the same private key stored in hardware token 130 may be used to access the private partitions on the multiple data storage devices. In an example, hardware token 130 stores private key 132 and a second private key. Private key 132 may unlock private partition 112. Partition controller 144 may determine whether the second private key unlocks a second private partition on a second storage device that is different from data storage 104. In response to determining that the second private key unlocks the second private partition, partition controller 144 unlocks the second private partition on the second storage device.

2. Private Key Unlocks Private Partition

In response to determining that private key 132 unlocks private partition 112, partition controller 144 unlocks private partition 112 on storage device 104. If private partition 112 is unlocked, it may be visible to operating system 116 and utility 118 may provide a user access to private partition 112. Computer system 102 indicates a connection to data storage 104 and in particular to private partition 112 when private partition 112 is unlocked. Accordingly, the user may access private partition 112 and write to, read from, and/or modify data stored on private partition 112. In an embodiment, operating system 116 is a LINUX® operating system, and utility 118 mounts private partition 112 onto operating system 116.

Token reader 142 may manipulate data or communications btw computer system 102 and data storage 104. In some embodiments, token reader 142 receives data from data storage 104 and manipulates the received data such that operating system 116 is unaware of private partition 112. For example, computer system 102 may request information about data storage 104, which may indicate that data storage 104 has two partitions. Token reader 142 may know that one of the indicated partitions is private partition 112 and thus modify the data such that computer system 102 thinks data storage 104 has only one partition. If data storage 104 has more than one private partition, token reader 142 may modify the reply to computer system 102 to remove mention of the private partitions.

As discussed above and further emphasized here, FIG. 1 is merely an example, which should not unduly limit the scope of the claims. For example, although computer system 102 and data storage 104 are illustrated as being connected via cable 106, this is not intended to be limiting. For example, in other embodiments, computer system 102 and data storage 104 may be connected via wireless technology.

Further, data storage 104 is indicated as being an external storage device that is remote from computer system 102. Other embodiments in which data storage 104 is located within computer system 102 are also within the scope of the disclosure. For example, the storage device may be a hard drive that is internal to computer system 102. In such an example, hardware detector 140 may be placed under a cover that is not metal to be able to more easily detect hardware token 130.

Furthermore, although hardware detector 140 is illustrated as being located inside data storage 104 in FIG. 1, hardware detector 140 may be located anywhere that would allow token reader 142 to read private key 132. For example, in some embodiments, hardware detector 140 is located inside cable 106.

Figure 2:
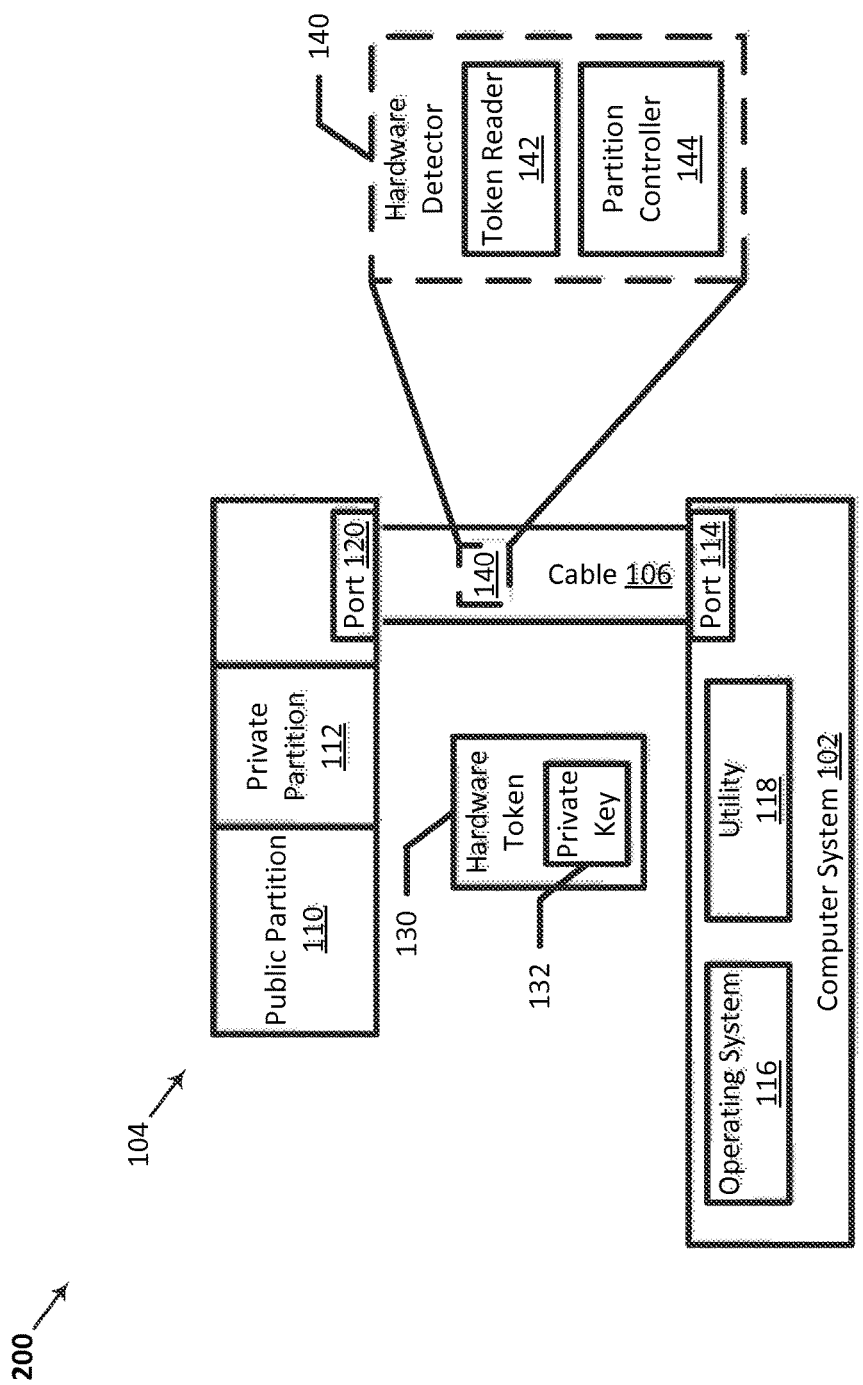
FIG. 2 is a block diagram illustrating a system for controlling access to the private partition on the storage device, according to some embodiments.

FIG. 2 is a block diagram 200 illustrating a system for controlling access to private partition 112 on storage device 104, according to some embodiments. FIG. 2 includes computer system 102 and data storage 104 coupled to cable 106, and also includes hardware token 130 and hardware detector 140. In FIG. 2, hardware detector 140 is located inside cable 106. When cable 106 is connected to data storage 104, hardware detector 140 may not have power yet. When cable 106 is connected to computer system 102, hardware detector 140 may have enough power such that token reader 142 may determine whether a hardware token is within the threshold proximity.

III. Example Method

Figure 3:
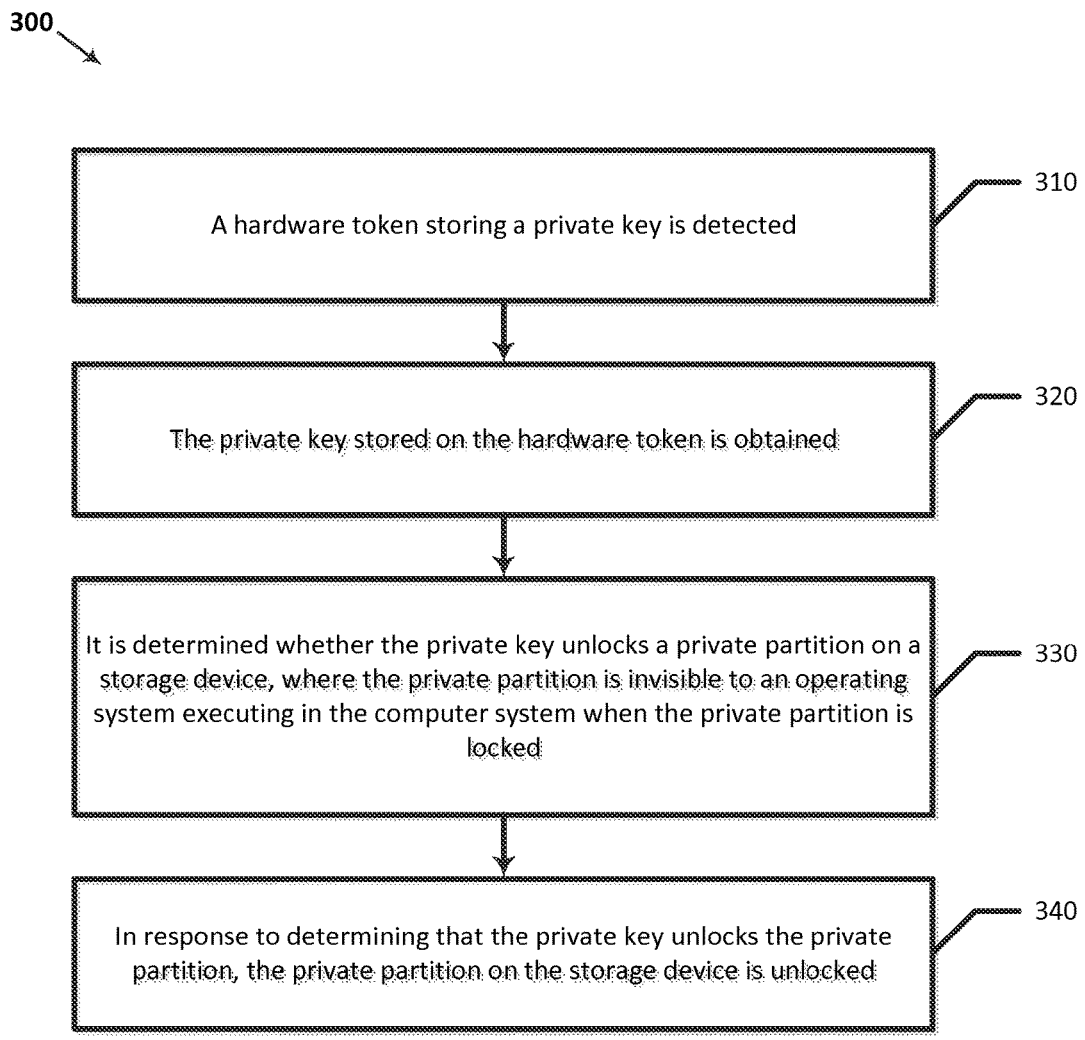
FIG. 3 is a flowchart illustrating a method of controlling access to the private partition on the data storage, according to some embodiments.

FIG. 3 is a flowchart illustrating a method 300 of controlling access to a private partition on a storage device, according to some embodiments. Method 300 is not meant to be limiting and may be used in other applications.

Method 300 includes blocks 310-340. In a block 310, a hardware token storing a private key is detected. In an example, token reader 142 detects hardware token 130 storing private key 132. Hardware token 130 is a physical object that is used to gain access to private partition 112 on data storage 104. When hardware token 130 is within a threshold proximity to token reader 142, token reader 142 may detect the hardware token.

In a block 320, the private key stored on the hardware token is obtained. In an example, token reader 142 obtains private key 132 stored on hardware token 130. Token reader 142 may receive hardware token 130 through wireless transfer technology (e.g., Wi-Fi) or other data transfer technology.

In a block 330, it is determined whether the private key unlocks a private partition on a storage device, where the private partition is invisible to an operating system executing in the computer system when the private partition is locked. In an example, partition controller 144 determines whether private key 132 unlocks private partition 112 on storage device 104, where private partition 112 is invisible to operating system 116 executing in computer system 102 when private partition 112 is locked. When private partition 112 is locked, the user does not have access to private partition 112.

In a block 340, in response to determining that the private key unlocks the private partition, the private partition on the storage device is unlocked. In an example, in response to determining that private key 132 unlocks private partition 112, partition controller 144 unlocks private partition 112 on storage device 104. Unlocking private partition 112 includes providing a user access to the private partition, and computer system 102 may indicate a connection to private partition 112 when private partition 112 is unlocked.

It is also understood that additional processes may be performed before, during, or after blocks 310-340 discussed above. It is also understood that one or more of the blocks of method 300 described herein may be omitted, combined, or performed in a different sequence as desired.

IV. Example Computing System

Figure 4:
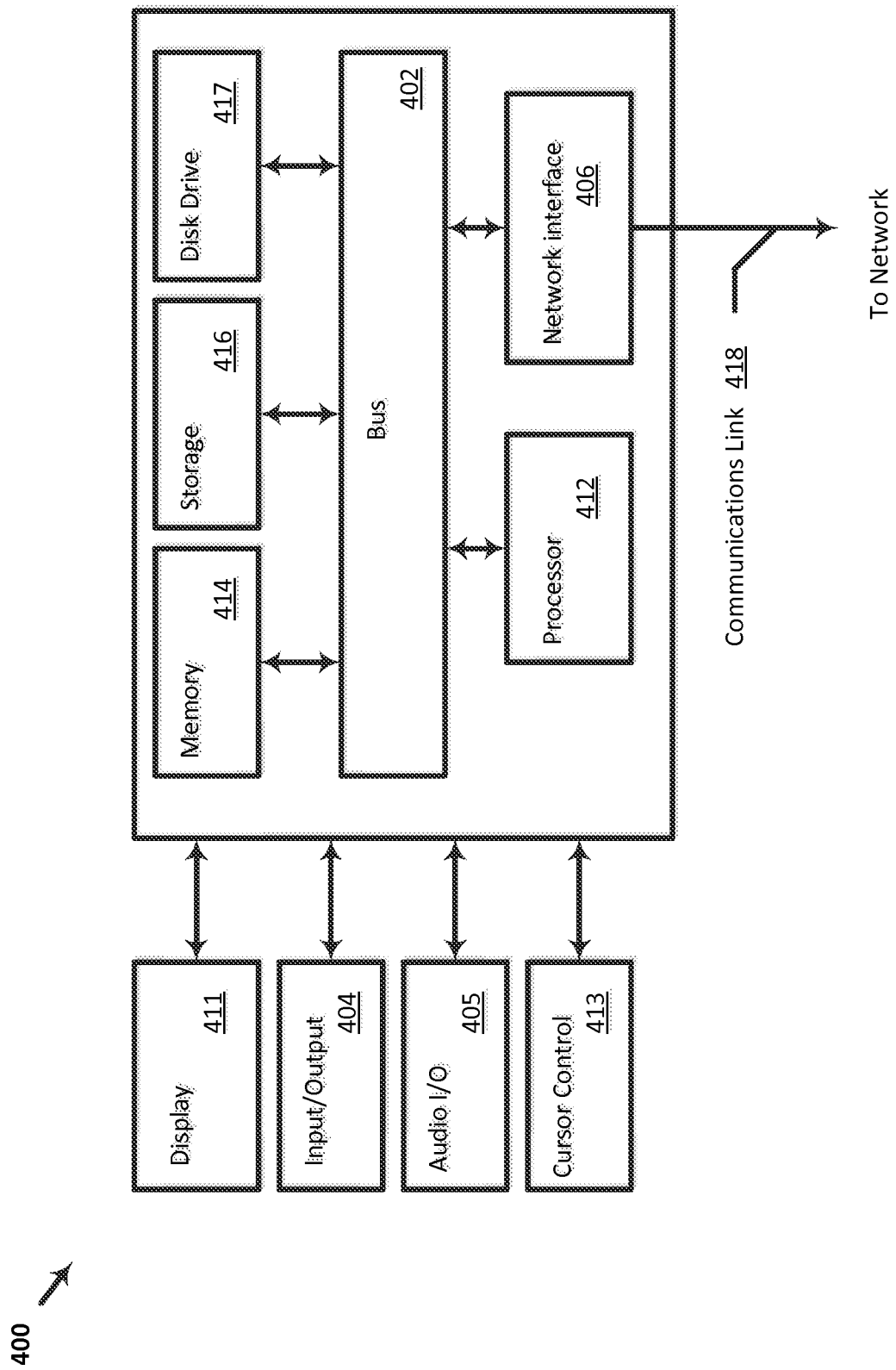
FIG. 4 is a block diagram of an electronic system suitable for implementing one or more embodiments of the present disclosure.

FIG. 4 is a block diagram of a computer system 400 suitable for implementing one or more embodiments of the present disclosure. In various implementations, computer system 102 may include one or more processors and may additionally include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the computing system using a computer network (not shown). The computer network may be any type of network including a LAN, a WAN, an intranet, the Internet, a cloud, and/or any combination of networks thereof that is capable of interconnecting computing devices and/or computer programs in the system.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. In an example, the user may request that data storage 104 be partitioned into a plurality of partitions and that one or more partitions of the plurality of partitions be private. The user may make the request using I/O component 404.

I/O component 404 may also include an output component such as a display 411, and an input control such as a cursor control 413 (such as a keyboard, keypad, mouse, etc.). In an example, computer system 102 indicates a connection to private partition 112 or a connection to public partition 110 via the display. If private partition 112 is locked, the user may be unable to determine that data storage 104 includes private partition 112 because it will not be listed as a drive by utility 118.

An optional audio input/output component 405 may also be included to allow a user to use voice for inputting information by converting audio signals into information signals. Audio I/O component 405 may allow the user to hear audio. A transceiver or network interface 406 transmits and receives signals between computer system 400 and other devices via a communication link 418 to a network. In an embodiment, the transmission is wireless, although other transmission mediums and methods may also be suitable. In an example, hardware detector 140 is stored on the hard drive of system 400 and detects hardware token 130 through wireless communications.

A processor 412, which may be a micro-controller, digital signal processor (DSP), or other processing component, processes these various signals, such as for display on display 411 coupled to computer system 400 or transmission to other devices via communication link 418. Processor 412 may also control transmission of information, such as cookies or IP addresses, to other devices. Components of computer system 400 also include a system memory component 414 (e.g., RAM), a static storage component 416 (e.g., ROM), and/or a disk drive 417.

Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 414, and transmission media includes coaxial cables, copper wire, and fiber optics, including wires that include bus 402. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 300) to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more specific purpose computers and/or computer systems, networked and/or otherwise. Where applicable, the ordering of various actions or blocks described herein may be changed, combined into composite actions or blocks, and/or separated into sub-actions or sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

We claim:

1. A method of controlling access to a private partition on a storage device that is connected to a computer system, comprising:
    detecting, at a token reader located within a threshold physical proximity to a storage device, a hardware token storing a first private key, the storage device including a public partition and a private partition and connected to a computer system including an operating system, wherein the private partition is not visible to the operating system when the private partition is locked, the private partition is visible to the operating system when the private partition is unlocked, and the public partition is visible to the operating system;
    reading, at the token reader, the first private key stored on the hardware token;
    assigning a label based on data encrypted using the first private key;
    decrypting the encrypted data using a second private key;
    determining whether the label matches an output of the decrypting;
    in response to determining that the label matches the output of the decrypting, determining that the first private key unlocks the private partition on the storage device; and
    in response to determining that the first private key unlocks the private partition, unlocking the private partition on the storage device.

2. The method of claim 1, wherein the unlocking includes providing a user access to the private partition.

3. The method of claim 2, wherein the computer system indicates a connection to the private partition when the private partition is unlocked.

4. The method of claim 1, further including:
detecting a second hardware token storing the second private key;
obtaining the second private key stored on the second hardware token; and
in response to determining that the label does not match the output of the decrypting, determining that the first private key does not unlock the private partition.

5. The method of claim 4, further comprising:
in response to determining that the first private key does not unlock the private partition, providing a user access to the public partition, wherein the computer system indicates a connection to the public partition when the private partition is locked.

6. The method of claim 1, further including:
receiving a request for information about the storage device, the request from the computer system; and
providing a response to the request to the computer system, wherein the response is devoid of information about the private partition if the private partition is locked, and the response includes information about the private partition if the private partition is unlocked.

7. A system for controlling access to a private partition on a storage device that is connected to a computer system, comprising:
a token reader that detects a hardware token storing a first private key and reads the first private key stored on the hardware token when the token reader is located within a threshold physical proximity to a storage device, wherein the storage device includes a public partition and a private partition and is connected to a computer system including an operating system; and
a partition controller that assigns a label based on data encrypted using the first private key, decrypts the encrypted data using a second private key, and determines whether the label matches an output of the decrypting, wherein in response to determining that the label matches the output of the decrypting, the partition controller determines that the first private key unlocks the private partition on the storage device, and in response to determining that the first private key unlocks the private partition, the partition controller unlocks the private partition on the storage device, wherein the private partition is not visible to the operating system when the private partition is locked, the private partition is visible to the operating system when the private partition is unlocked, and the public partition is visible to the operating system.

8. The system of claim 7, wherein the storage device is an external storage device that is remote from the computer system.

9. The system of claim 7, wherein the storage device is a hard drive and the operating system detects the storage device as a local hard drive.

10. The system of claim 7, wherein the partition controller manipulates data transmitted from the storage device to the computer system.

11. The system of claim 7, wherein the hardware token stores a third private key, and wherein the partition controller determines whether the third private key unlocks the private partition.

12. The system of claim 11, wherein in response to determining that the third private key unlocks the private partition, the partition controller unlocks the private partition on the storage device.

13. The system of claim 7, wherein the hardware token stores a third private key, and wherein the partition controller determines whether the third private key unlocks a second private partition on a second storage device.

14. The system of claim 13, wherein in response to determining that the third private key unlocks the second private partition, the partition controller unlocks the second private partition on the second storage device.

15. The system of claim 7, wherein the token reader is located inside the storage device.

16. The system of claim 7, wherein the token reader obtains the first private key via a wireless network.

17. The system of claim 7, wherein the token reader is located inside a cable that physically connects the computer system and storage device.

18. The system of claim 7, wherein the public partition is visible to the operating system executing in the computer system when the private partition is locked.

19. The system of claim 7, wherein the storage device includes a transformer that transfers electric energy to the hardware token.

20. A machine-readable medium comprising a plurality of machine-readable instructions that when executed by one or more processors is adapted to cause the one or more processors to perform a method comprising:
detecting, at a token reader located within a threshold physical proximity to a storage device, a hardware token storing a first private key, the storage device including a public partition and a private partition and connected to a computer system including an operating system;
reading, at the token reader, the first private key stored on the hardware token;
assigning a label based on data encrypted using the first private key;
decrypting the encrypted data using a second private key;
determining whether the label matches an output of the decrypting;
in response to determining that the label matches the output of the decrypting, determining that the first private key unlocks the private partition on the storage device; and
in response to determining that the first private key unlocks the private partition, unlocking the private partition on the storage device, wherein the private partition is not visible to the operating system when the private partition is locked, the private partition is visible to the operating system when the private partition is unlocked, and the public partition is visible to the operating system.

* * * * *